F. D. HALLOCK.
SYSTEM OF ELECTRIC MOTOR CONTROL.
APPLICATION FILED AUG. 12, 1912.

1,145,680. Patented July 6, 1915.

WITNESSES:

INVENTOR
Fletcher D. Hallock
BY
ATTORNEY

UNITED STATES PATENT OFFICE.

FLETCHER D. HALLOCK, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF ELECTRIC-MOTOR CONTROL.

1,145,680.  Specification of Letters Patent.  Patented July 6, 1915.

Application filed August 12, 1912. Serial No. 714,504.

*To all whom it may concern:*

Be it known that I, FLETCHER D. HALLOCK, a citizen of the United States, and a resident of Pittsburgh, in the county of Allegheny and State of Pennsylvania, have invented a new and useful Improvement in Systems of Electric-Motor Control, of which the following is a specification.

My invention relates to systems of control for electric motors and it has special reference to such systems as are adapted to govern the operation of electric motors during periods of starting or acceleration.

One of the objects of my invention is to provide a system of the above-indicated character which shall be simple in arrangement and particularly adapted to effectively prevent the abuse of an electric motor during its starting operation by reason of attempting to bring the same up to speed at an excessive rate.

Another object of my invention is to provide a system which shall embody a starting resistance and a suitable switching device for short-circuiting said resistance step-by-step, and to make adequate provision for necessitating movement of the switching device to its full open position before the starting operation can be performed, thereby preventing connection of the motor on the line without the proper amount of resistance in circuit. Furthermore, I associate with the switching device, hereinbefore mentioned, suitable means for effecting the interruption of the supply of energy to the motor in case the switching device is left in an intermediate position, or in case it is moved out of its full closed position after having been fully closed.

By reason of my invention, the motor is protected against excessive operating and starting conditions and may be operated without difficulty by a moderately skilled or unskilled attendant.

My invention may best be understood by reference to the accompanying drawing in which—

Figure 1:
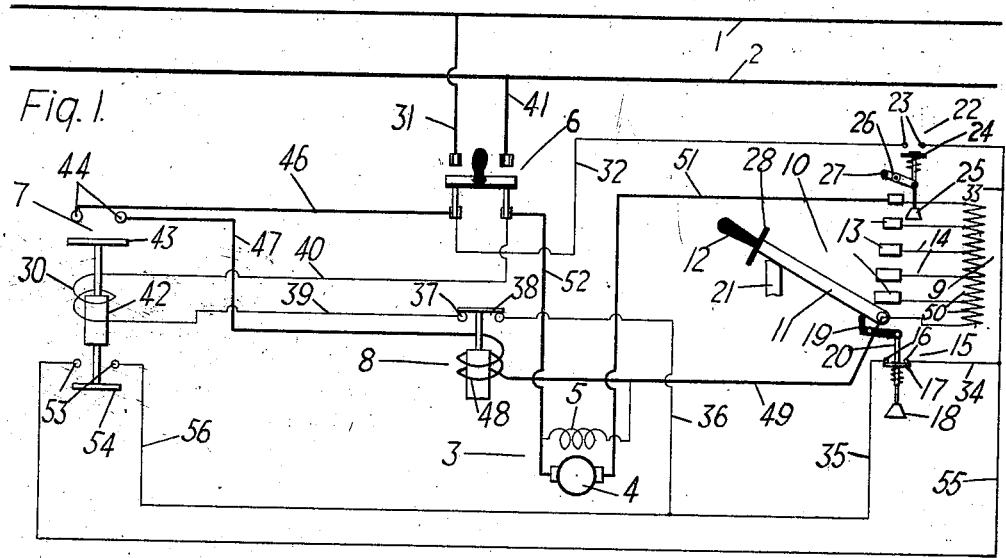
Figure 2:
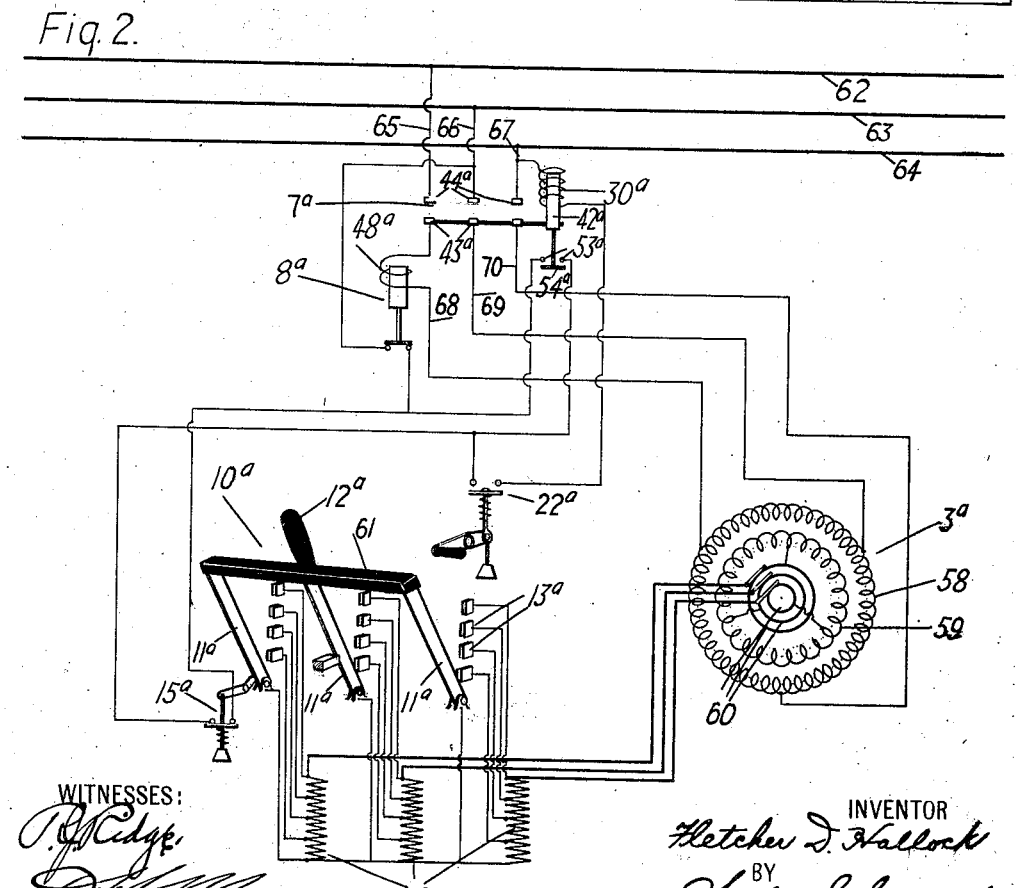

Figure 1 is a diagrammatic view of a system of control embodying my invention, and Fig. 2 is a similar view embodying a modification thereof.

Referring to Fig. 1, a supply circuit 1—2 is adapted to deliver energy to an electric motor 3, having an armature 4 and a field magnet winding 5, through a line switch 6, an electrically operated main switch 7, an overload relay 8, a starting resistor 9 and a switching device 10, adapted to govern the circuit connections of said starting resistor.

The motor 3, the line switch 6, the electrically operated switch 7 and the overload relay 8 may be of any well known construction and no detailed description of these devices is deemed necessary, inasmuch as the construction and the operation of such devices is old and familiar to those skilled in the art. Since these devices are shown for illustrative purposes, any other suitable devices for accomplishing the same results may be employed.

The switching device 10 preferably comprises a pivotally mounted switch member or blade 11 that is provided with a handle 12 and is adapted to successively and coöperatively engage a plurality of stationary contact members 13, said members being electrically connected to the starting resistor 9 at intermediate points by means of conductors 14.

I do not wish to be restricted to the particular form of starting device shown and described because various other forms may be equally well employed.

An auxiliary switch 15, having stationary contact terminals 16 and a bridging switch member 17, is biased to its open position by means of a weight 18, or other means, and is mechanically associated with the switch member 11, when it occupies its full open position, by means of a suitable pivotally mounted bell-crank lever 19 and a supporting stem 20. The arrangement of parts is such that the auxiliary switch 15 is maintained in a closed position only when the switch member 11 is in its full open position and rests against a suitable stop 21.

An auxiliary switch 22, having stationary contact terminals 23 and a bridging member 24, is normally biased to its open position by a weight 25 and is mechanically associated with a pivotally mounted lever member 26 having a handle 27. By means of the handle 27, the switch 22 may be manually held in its closed position during the starting operation and may be restrained in said position by means of the coöperative engagement of the handle 27 and a projecting member 28 that is associated with the handle 12 of the switch member 11 when said switch member occupies its full closed position.

Evidently, the structural details of the switches 15 and 22 and the mechanisms by means of which the operation of said switches is rendered dependent upon the position of the switch member 11, form no material parts of my present invention, and any suitable devices for effecting the same results in substantially the same manner may be employed in lieu thereof.

Assuming the arrangement of parts and the circuit connections to be as shown in the figure, the operation of the system is as follows: In order to start the motor 3, the line switch 6 is closed, after which the auxiliary switch 22 is manually closed by the operator and held in this position during the complete starting operation. As soon as the switch 22 is closed, energy is supplied to a closing coil 30 of the electrically operated switch 7 from the supply circuit conductor 1, through conductor 31, line switch 6, conductor 32, coöperating switch members 23 and 24 of auxiliary switch 22, conductor 33, conductor 34, coöperating switch members 16 and 17 of auxiliary switch 15, conductor 35, conductor 36, coöperating switch members 37 and 38 of the overload relay 8, conductor 39, closing coil 30, conductor 40, line switch 6 and conductor 41 to the supply circuit conductor 2. Upon the completion of the circuit just recited, a movable core member 42 of the electrically operated switch 7 becomes energized and the coöperative engagement of a movable switch member 43 and stationary contact terminals 44 of said switch is effected. Thus, a circuit is established from the supply circuit conductor 1, through conductor 31, line switch 6, conductor 46, coöperating switch members 43 and 44 of the electrically operated switch 7, conductor 47, energizing coil 48 of the overload relay 8, conductor 49, all of the sections 50 of the starting resistor 9, conductor 51, motor 3, conductor 52, line switch 6 and conductor 41 to the supply circuit conductor 2. Having established the circuits just described, energy is supplied to the motor 3 through all of the sections of resistor 9 and said motor is caused to start.

In order to bring the motor up to full running speed, the switch member 11 of the starting switch 10 is closed gradually and successively upon its coöperating stationary contact members 13, thereby short-circuiting and eliminating from circuit the several sections 50 of the starting resistor 9 step-by-step. It will, of course, be understood that, as the resistor 9 is gradually short-circuited, the energy supplied to the motor 3 and, consequently, the speed thereof will be increased.

In case the operator attempts to close the starting switch 10 at a speed in excess of a predetermined rate, the current in the motor circuit increases to such a value that the overload relay 8 is energized and effects a separation of its coöperating contact members 37 and 38. Thus, an interruption in the control circuit of the closing coil 30 of electrically operated switch 7 is effected, and said switch is allowed to open, thereby interrupting the supply of energy to the motor 3. It is obvious, therefore, that the motor 3 cannot be subjected to excessive starting currents by reason of carelessness of the operator or the improper operation of the starting switch 10.

It should be borne in mind that it is necessary for the operator to hold the auxiliary switch 22 closed during the entire closing operation and, furthermore, that as soon as the switch member 11 of the starting switch 10 has been moved from its initial full open or "off" position, the weight 18 causes the separation of the coöperating contact members 16 and 17 of the auxiliary switch 15. Thus, the control circuit from the conductor 33, through conductors 34 and 35 to the conductor 36, is interrupted. However, when the electrically operated switch 7 closes, its coöperating switch members 53 and 54 are closed, thereby establishing a shunt circuit from the conductor 33, through conductor 55, coöperating switch members 53 and 54 of the electrically operated switch 7, and conductor 56 to the conductor 36. Hence, when the auxiliary switch 15 opens, the control circuit of the electrically operated switch 7 is still maintained through the switch members 53 and 54 associated therewith.

For a further understanding of the operation of the system, let it be assumed that the starting switch 10 occupies an intermediate position and that the action of the overload relay 8, in response to an excessive current, has effected the opening of the electrically operated switch 7. Under these conditions, it will be seen that, although the auxiliary switch 22 may be held closed, no energy is delivered to the closing coil 30 of the switch 7 by reason of the fact that the auxiliary switch 15 is open as well as the coöperating contact members 53 and 54 which are associated with the switch 7.

In order to again start the motor 3, it is, therefore, necessary to move the switch member 11 of the starting switch 10 back to its full open or "off" position against the stop 21, whereby the auxiliary switch 15 is again closed by reason of the mechanical connection between the member 11 and the switch 15 hereinbefore described. Having returned the switch member 11 to its "off" position, the starting operation may then be carried out in the manner already set forth.

After having fully closed the starting switch 10, the projecting member 28, associated with the movable switch member 11 thereof, coöperatively engages the handle 27 of the pivotally mounted lever 26 and thereby restrains the auxiliary switch 22 in its closed position, after which the motor 3 may be allowed to operate without further attention.

By reason of the peculiar arrangement of the auxiliary switch 22 with respect to the starting switch 10, it is manifest that an interruption of the supply of energy to the motor 3 is effected in case the operator should release the auxiliary switch 22 and attempt to leave the switching devices 10 in an intermediate position, for the reason that an interruption of the control circuit to the closing coil 30 of electrically operated switch would immediately be effected. It is impossible, therefore, to operate the motor 3 with any of the starting resistor 9 in circuit therewith except during the starting operation when the operator manually holds the auxiliary switch 22 closed.

Assuming the motor 3 to be operating at full running speed and the switch 10 to occupy its full closed position, it is evident that an interruption of the supply of energy to the motor 3 will be effected if the movable member 11 of the starting switch 10 is moved out of its full closed position. An interruption of the supply of energy to the motor 3 is also effected in the event of a condition of no-voltage obtaining on the system, inasmuch as such a condition would deenergize the closing coil 30 of the electrically operated switch 7 and said switch would open.

Referring now to Fig. 2, a control system similar to that hereinbefore shown and described, is shown which is adapted for operation upon a polyphase system of distribution. A motor $3^a$ comprises a stationary primary member 58 and a movable secondary member 59 which is electrically connected, at a plurality of points, to a plurality of collector rings 60, said rings being electrically connected to a plurality of sections of starting resistor $9^a$.

Each portion of starting resistor $9^a$ is electrically connected to a plurality of stationary contact members $13^a$ which are adapted to be coöperatively engaged by a pivotally mounted switch member $11^a$. The several movable switch members $11^a$ are mechanically and rigidly associated by means of a cross bar 61 of insulating material having a handle $12^a$ associated therewith. The rigidly connected switch members $11^a$ and the coöperating stationary contact terminals $13^a$ constitute a three pole starting switch $10^a$, which corresponds to the starting switch 10 described in connection with Fig. 1. A plurality of auxiliary switches $22^a$ and $15^a$ are also associated with the starting switch $10^a$ in a manner similar to that hereinbefore set forth.

The motor $3^a$ receives energy from a polyphase source 62, 63 and 64, through a plurality of conductors 65, 66 and 67, an electrically operated switch $7^a$ and a plurality of conductors 68, 69 and 70. The electrically operated switch $7^a$ comprises a plurality of stationary contact member $44^a$, and movable coöperating contact members $43^a$ and is also provided with the closing coil $30^a$, a magnetizable core $42^a$ and with auxiliary coöperating contact members $53^a$ and $54^a$. An energizing coil $48^a$ of an overload relay $8^a$ is connected in circuit with the conductor 68 and is, therefore, responsive in its action to the amount of current traversing said conductor.

Assuming the circuit connections to be as shown, the operation of the system is briefly as follows, no detailed description thereof being given for the reason that it is believed that those skilled in the art will experience no difficulty in understanding the operation and in tracing the circuits thereof by reason of their similarity to the operation and circuit connections hereinbefore fully described with respect to Fig. 1: The auxiliary switch $22^a$ is first closed manually, thereby energizing the closing coil $30^a$ and effecting the closure of the electrically operated switch $7^a$. Thus, energy is supplied to the primary winding 58 of the motor $3^a$ and said motor is started from rest. The closure of the electrically operated switch $7^a$ also effects the closure of the auxiliary contact members $53^a$ and $54^a$, thereby establishing a multiple circuit around the auxiliary switch $15^a$ to insure the energization of the closing coil $30^a$ subsequent to the operation of the starting switch $10^a$. In order to bring the motor $3^a$ up to speed, the starting switch $10^a$ is gradually closed upon its stationary contact members $13^a$, whereby the several sections of starting resistor $9^a$ are eliminated step-by-step from the secondary circuit of the motor $3^a$ until said starting switch $10^a$ is fully closed, thereby mechanically restraining the auxiliary switch $22^a$ in its closed position.

Although I have shown and described systems of control embodying specific arrangements of apparatus and circuit connections, I do not wish to be restricted in this respect, as many modifications may be effected without departing from the spirit and scope of my invention, and I desire that only such limitations shall be imposed as are indicated in the appended claims.

I claim as my invention:

1. In a control system, the combination with a motor, a starting resistor, a short-circuiting switching device therefor and an electrically operated line switch, of an auxiliary switch held in the energizing circuit of said electrically operated switch when said short-circuiting switch is in its off position, and a second auxiliary switch in series circuit therewith and manually held closed during the short-circuiting operation.

2. In a control system, the combination with a supply circuit, an electric motor, a starting resistor therefor, and switching means for gradually short-circuiting said resistor, of manually restrained means for interrupting the supply of energy to said motor if released during the starting operation, said means being mechanically restrained during normal operation of the motor, and means in series circuit with said last named means for preventing further operation of the system until said switching means is returned to its "off" position.

3. In a control system, the combination with a supply circuit, an electric motor, a starting resistor therefor and switching means for gradually short-circuiting said resistor, an electrically operated switch in circuit with said motor, of means manually restrained during starting and mechanically restrained thereafter for interrupting the supply of energy to said electrically operated switch if released during the starting operation controlling the supply of energy to said switch, means for preventing further operation of the system until said switching means is returned to its "off" position, and electro-responsive means for interrupting the supply of energy to said switch if said switching means is operated in excess of a predetermined speed.

4. In a control system, the combination with a supply circuit, an electric motor, a starting resistor therefor, a switching device for short-circuiting said resistor step by step, and a main switch in circuit with said motor, of an auxiliary switch for controlling the operation of said main switch, said auxiliary switch being biased to one of its positions and adapted to be manually restrained in its other position during the starting operation and mechanically restrained in said position by said switching device when said device is fully closed.

5. In a control system, the combination with a supply circuit, a translating device and a manually operated starting device therefor, of automatic means for interrupting the supply of energy when said starting device is operated in excess of a predetermined speed, manually restrained means for interrupting the supply of energy when released during the starting operation, and means for preventing further operation of said system until said starting device is returned to its "off" position.

6. In a control system, the combination with a supply circuit, a translating device, a starting device therefor, and an electrically operated switch in circuit with said translating device, of a plurality of auxiliary switches in the control circuit of said electrically operated switch, said auxiliary switches being respectively mechanically associated with said starting device when it occupies its full open and its full closed position, whereby the operation of said electrically operated switch is rendered dependent upon the position of said starting device.

7. In a control system, the combination with a supply circuit, a translating device, a manually operated switching device therefor, and an electrically actuated switch in circuit with said translating device, of a plurality of auxiliary switches in the control circuit of said electrically operated switch and mechanically dependent upon the operation of said starting device for controlling the operation of said electrically operated switch.

8. In a control system, the combination with a supply circuit, an electric motor, a starting resistor therefor, a switching device for short-circuiting said resistor step by step, and an electrically operated switch in circuit with said motor, of electro-responsive means for interrupting the control circuit of said electrically operated switch under predetermined circuit conditions, an auxiliary switch in said control circuit and adapted to be held closed by said switching device only when it occupies its full open position, and a second auxiliary switch in said control circuit normally biased to its open position and adapted to be manually held in its closed position during the starting operation of said motor and to be restrained in said position by said switching device when said switching device occupies its full closed position.

9. In a control system, the combination with a supply circuit, an electric motor, a starting resistor, a switching device for short-circuiting said resistor and an electrically operated switch in circuit with said motor, of a plurality of auxiliary switches initially in series circuit relation and adapted to deliver energy for operating said switch and held in their closed positions, respectively, when said switching device is open, when it is closed and under normal operating conditions.

In testimony whereof, I have hereunto subscribed my name this 31st day of July, 1912.

FLETCHER D. HALLOCK.

Witnesses:
 THEODORE VARNEY,
 B. B. HINES.

It is hereby certified that in Letters Patent No. 1,145,680, granted July 6, 1915, upon the application of Fletcher D. Hallock, of Pittsburgh, Pennsylvania, for an improvement in "Systems of Electric-Motor Control," errors appear in the printed specification requiring correction as follows: Page 4, line 29, after the word "operation" insert the word *means;* same page, line 30, strike out the word "means"; and that the said Letters Patent should be read with these corrections therein that the same may conform to the record of the case in the Patent Office.

Signed and sealed this 10th day of August, A. D., 1915.

[SEAL.]
R. F. WHITEHEAD,
*Acting Commissioner of Patents.*